(12) United States Patent
Tarr et al.

(10) Patent No.: US 12,484,738 B2
(45) Date of Patent: Dec. 2, 2025

(54) MIXING ASSEMBLY FOR STAND MIXER WITH TWO OR MORE CONNECTIONS

(71) Applicant: Haier US Appliance Solutions, Inc., Wilmington, DE (US)

(72) Inventors: Ronald Scott Tarr, Louisville, KY (US); Bobby Lee Lindsey, Louisville, KY (US); Yenhsi Lin, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 588 days.

(21) Appl. No.: 17/972,247

(22) Filed: Oct. 24, 2022

(65) Prior Publication Data

US 2024/0130568 A1 Apr. 25, 2024
US 2024/0225363 A9 Jul. 11, 2024

(51) Int. Cl.
*A47J 43/00* (2006.01)
*A47J 43/044* (2006.01)
*A47J 43/08* (2006.01)

(52) U.S. Cl.
CPC ........... *A47J 43/082* (2013.01); *A47J 43/044* (2013.01); *A47J 2043/04454* (2013.01)

(58) Field of Classification Search
CPC ............ A47J 2043/04454; A47J 43/082; A47J 43/044
See application file for complete search history.

(56) References Cited

U.S. PATENT DOCUMENTS

| | | | |
|---|---|---|---|
| 2019/0150671 A1 | 5/2019 | Williams et al. | |
| 2019/0282035 A1* | 9/2019 | Jin | A21C 1/02 |
| 2020/0245638 A1 | 8/2020 | Crema et al. | |
| 2021/0282597 A1* | 9/2021 | Lin | A47J 43/044 |

FOREIGN PATENT DOCUMENTS

| | | |
|---|---|---|
| DE | 102017223672 B4 | 8/2021 |
| EP | 2892405 B1 | 10/2019 |
| ES | 2642376 B1 | 6/2018 |

* cited by examiner

*Primary Examiner* — Anshu Bhatia
(74) *Attorney, Agent, or Firm* — Dority & Manning, P.A.

(57) ABSTRACT

A stand mixer has a vertical direction, a transverse direction, and a lateral direction and includes a motor, a head comprising a central shaft operably coupled to the motor and rotating about a central axis, and an offset shaft operably coupled to the motor and rotating about an offset axis, and a mixing assembly comprising a transmission assembly mechanically coupling the central shaft and the offset shaft, and a mixer attachment mechanically coupled to the transmission assembly, wherein the central shaft and the offset shaft provide an input motion and the transmission assembly generates an output motion from input motion, the mixer attachment moving in the output motion, and wherein the input motion is different from the output motion.

18 Claims, 8 Drawing Sheets

MIXING ASSEMBLY FOR STAND MIXER WITH TWO OR MORE CONNECTIONS

FIELD OF THE INVENTION

The present subject matter relates generally to stand mixers, and more particularly to attachments for stand mixers.

BACKGROUND OF THE INVENTION

Stand mixers generally have a bowl and a head onto which attachments, such as mixing attachments, are mounted. The head may have an output carrier that spins in one direction about a central axis and an output shaft that rotates in another direction. In this regard, the output shaft is attached to the output carrier but is offset from the central axis. A motor spins the output shaft and the output carrier, which in turn spins the attachment and mixes material within the bowl. Specifically, the motor generates a planetary motion for the output shaft in relation to the central axis. Mixing attachments are attached to the output shaft to move in this planetary motion within the bowl.

Planetary motion has been an industry standard for stand mixers for many years. Attachments generally attach to the output shaft, generally only moving in the planetary fashion, which limits movement types and mixing options. Attachments may have different shapes to mix different components in the bowl, such as a paddle, whisk, or dough hook. However, the planetary motion limits the type of mixing or movement that can occur within the bowl.

Challenges exist in that planetary motion may be limiting or may prevent some types of mixing. Speeds are also limited to the set speeds, making the stand mixer unfit for mixing jobs that require different mixing speeds, orientations, or movement.

Accordingly, a stand mixer that has improved versatility in terms of movement profiles and rotational speeds would be useful. Further, a stand mixer with attachments that move in patterns other than planetary movement would be beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a stand mixer having a vertical direction, a transverse direction, and a lateral direction is provided. The stand mixer includes a motor, a head comprising a central shaft operably coupled to the motor and rotating about a central axis, and an offset shaft operably coupled to the motor and rotating about an offset axis, and a mixing assembly comprising a transmission assembly mechanically coupling the central shaft and the offset shaft, and a mixer attachment mechanically coupled to the transmission assembly, wherein the central shaft and the offset shaft provide an input motion and the transmission assembly generates an output motion from input motion, the mixer attachment moving in the output motion, and wherein the input motion is different from the output motion.

According to another exemplary aspect of the present disclosure, a stand mixer having a vertical, a transverse, and a lateral direction is provided. The stand mixer includes a motor, a head comprising a central shaft operably coupled to the motor and rotating about a central axis, and an auxiliary attachment point, and a mixing assembly comprising a transmission assembly mechanically coupling the central shaft and the auxiliary attachment point, and a mixer attachment mechanically coupled to the transmission assembly, wherein the central shaft and the auxiliary attachment point provide an input motion and the transmission assembly generates an output motion from input motion, the mixer attachment moving in the output motion, and wherein the input motion is different from the output motion.

According to another exemplary aspect of the present disclosure, a stand mixer having a vertical, a transverse, and a lateral direction is provided. The stand mixer includes a motor, a head comprising a central shaft operably coupled to the motor and rotating about a central axis, an offset shaft operably coupled to the motor and rotating about an offset axis, and a stationary shaft, and a mixing assembly comprising a transmission assembly mechanically coupling at least two of: the central shaft, the offset shaft, or the stationary shaft, and a mixer attachment mechanically coupled to the transmission assembly, wherein at least two of the central shaft, the offset shaft, or the stationary shaft provide an input motion and the transmission assembly generates an output motion from input motion, the mixer attachment moving in the output motion, and wherein the input motion is different from the output motion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Use of the same or similar reference numerals in the figures denotes the same or similar features unless the context indicates otherwise.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related.

The terms "coupled," "fixed," "stationary," "attached to," and the like refer to both direct coupling, fixing, or attaching, as well as indirect coupling, fixing, or attaching through one or more intermediate components or features, unless otherwise specified herein.

The present invention advantageously provides a stand mixer that includes a head, a motor, and a mixing assembly. The mixing assembly may include a transmission assembly and a mixer attachment. The mixing assembly may be mechanically coupled to at least two shafts located on the stand mixer, at least one of the shafts rotatable by the motor. This mechanical coupling may allow the mixer attachment to move in different patterns from a planetary rotation. For example, the mixer attachment may come in various forms and perform various tasks, including oscillating or pounding, mixing about a different axis from any of the at least two shaft axes, and rotating faster or slower than any of the at least two shafts of the stand mixer. Rotation may be translated into nonrotational movement, or into a more complex rotational movement, as will be described herein. The mixing assembly of the stand mixer may allow a user to utilize the stand mixer for applications other than mixing, mixing in different or improved ways, or for more delicate mixture incorporation.

Figure 1:
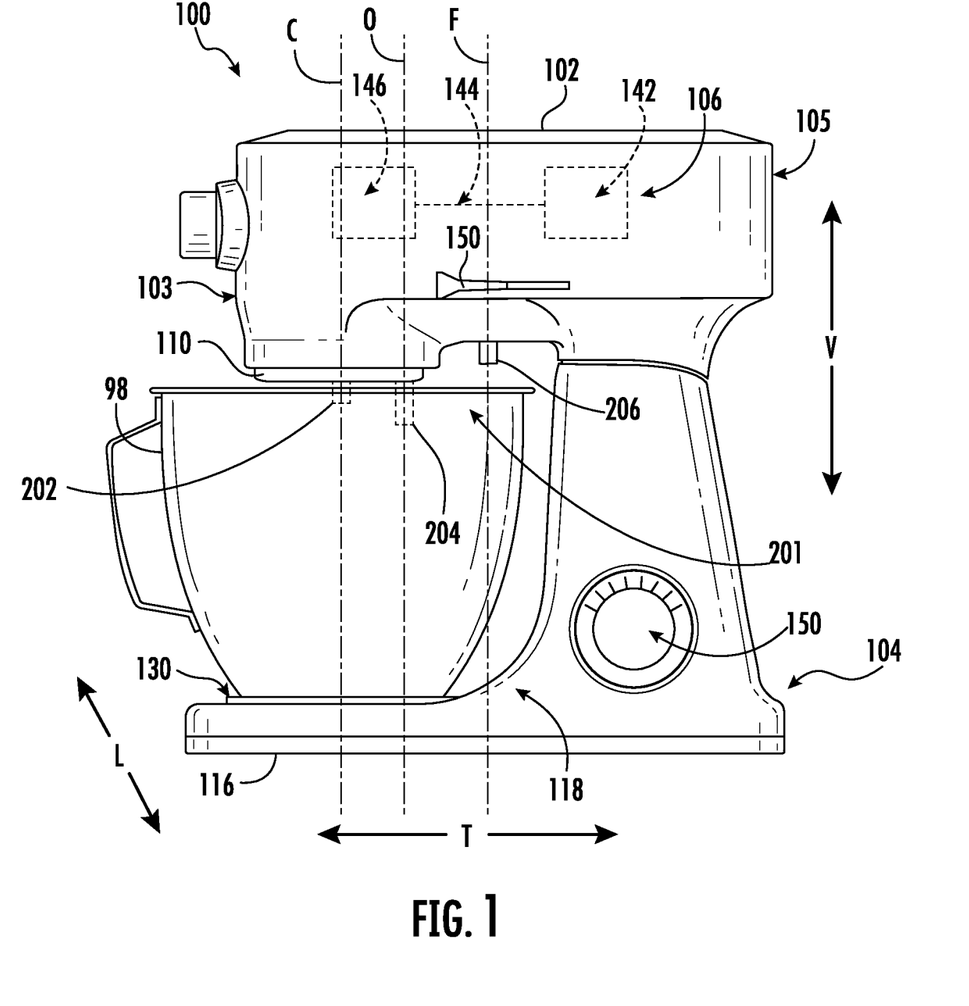
FIG. 1 provides a perspective view of a stand mixer according to exemplary embodiments of the present disclosure.

The figures depict an exemplary stand mixer appliance 100 that may be configured in accordance with various aspects of the present disclosure. It should be appreciated that the invention is not limited to any particular style, size, model, or shape for stand mixer appliance 100. The exemplary embodiment in FIG. 1 is for illustrative purposes only. For example, appliance 100 may have different shapes and appearances for one or more parts, different motor and gear configurations, and other differences while remaining within the scope of the claimed subject matter.

With reference to FIG. 1, for the particular embodiment shown, mixer appliance 100 includes a head 102 and a base 104 with a casing 106 surrounding head 102. Stand mixer appliance 100 extends between head 102 and base 104 in a vertical direction V, across head 102 in a lateral direction L, and from a front 103 to a back 105 in a transverse direction T. The vertical direction V, lateral direction L, and transverse direction T are perpendicular to one another.

Head 102 is pivotally mounted to base 104 and extends transversely between front 103 and back 105 of stand mixer appliance 100 when in the mixing position shown in FIG. 1. In some embodiments, head 102 may be non-pivotably attached to base 104, but support members for bowl 108 (not shown) may raise and lower. Other configurations may be used to allow for access to bowl 108 or to a mixing assembly 210, as otherwise understood. For this embodiment, base 104 includes upright support 112 and a horizontal base member 116. As shown, upright support 112 extends vertically from horizontal base member 116 and horizontal base member 116 extends transversely in front of upright support 112.

Horizontal base member 116 includes a bowl seat 130 that may be rotatable about a vertical axis. In some embodiments, bowl seat 130 may be concave, grooved, or otherwise shaped to accept bowl 108. In some embodiments, support arms (not shown) or equivalent support structures may be used to hold bowl 108, as would be understood. Other shapes and constructions may be used for bowl stand 120 as well.

Head 102 may include an output carrier 110 and a plurality of shafts or connectors to connect to a mixing assembly 210, as will be described in more detail below. Output carrier 110 may be configured to rotate about a central axis C. As shown, output carrier 110 is located on a lower portion or underside 126 of head 102 and forward of upright support 112 along transverse direction T.

As shown, a motor 142 is disposed within head 102 and enclosed by casing 106. In some embodiments, motor 142 may be disposed within base 104, including within upright support 112. A drivetrain 144 connects motor 142 with one or more gears 146 for causing movement of output carrier 110. Gears 146 may allow for selection by the user of different rotating speeds for output carrier 110.

Appliance 100 may include one or more controls 150 for operations such as selectively powering motor 142, choosing the speed of rotation for output carrier 110, locking the position of head 102 relative to base 104 during mixing, or other features. In some embodiments, controls 150 may include a rotational direction operation selection, allowing a user to select the direction of rotation of the offset shaft 204.

During use, output carrier 110 may rotate in a circular fashion about central axis C. Motor 142 may generate rotational movement of output carrier 110 by way of drivetrain 144 or gears 146. In some embodiments, motor 142 is configured to be reversible, to rotate the output carrier in a forward direction and in a reverse direction. For example, motor 142 may rotate the output carrier 110 in a clockwise direction and in a counterclockwise direction.

Figure 2:
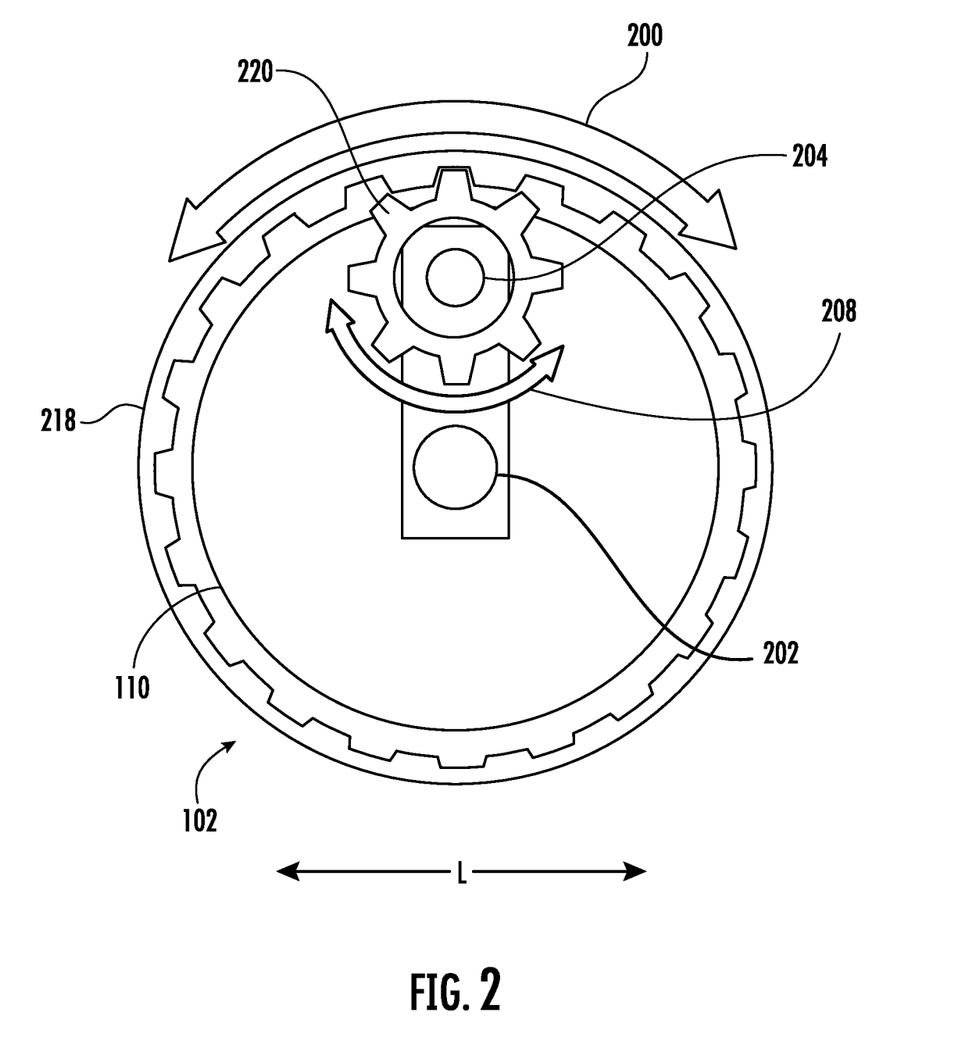
FIG. 2 provides a schematic view of a carrier assembly of an exemplary embodiment of a stand mixer head according to exemplary embodiments of the present disclosure.

Turning to FIGS. 1 and 2, head 102 may include a central shaft 202. Central shaft 202 may be connected to output carrier 110. As shown, central shaft 202 is located at the center of output carrier 110. Central shaft 202 is configured to rotate about central axis C in a central rotational direction 200. Central shaft 202 is operably coupled to motor 142. In some examples, central shaft 202 is rotated by motor 142 (e.g., by way of drivetrain 144 or gears 146) about central axis C, central shaft 202 rotating output carrier 110.

Head 102 may include an auxiliary attachment point 201 (e.g., offset shaft 204 or stationary shaft 206). According to an example embodiment, auxiliary attachment point 201 may define an auxiliary axis (e.g., offset axis O or stationary axis F). Auxiliary attachment point 201 is shown in FIG. 2 as either offset shaft 204 or stationary shaft 206. Auxiliary attachment point 201 may be located in any location along head 102, or on upright support 112, depending on the needs of the embodiment. Auxiliary attachment point 201 provides a second connection point to mixing assembly 210. Auxiliary attachment point 201 may be connected to motor 142, and have movement independent of central shaft 202, or may be stationary on head 102 or base 104, including upright support 112. Indeed, auxiliary attachment point 201 may be any suitable for fixing the motion of a portion of mixing assembly 210.

In some embodiments, auxiliary attachment point 201 may be an offset shaft 204 and the auxiliary axis may be an offset axis O. Offset shaft 204 may be operably coupled to motor 142. Offset shaft 204 may be mechanically coupled to output carrier 110. For example, offset shaft 204 may be connected to output carrier 110 and may further be configured to rotate about offset axis O in an offset rotational direction 208. Offset shaft 204 may extend from output carrier 110 and may be offset from central axis C. Offset shaft 204 is located on output carrier 110 and may be offset from a center (e.g., central shaft 202) of output carrier 110.

As shown in FIG. 2, offset shaft 204 is connected to a central shaft 202 of output carrier 110 within head 102. During use, central shaft 202 is rotated by motor 142, and offset shaft 204 are rotated around central shaft 202 in a circular fashion. Output carrier 110 is also rotated with central shaft 202. According to the arrangement, a ring gear 218 may be stationary within head 102, surrounding offset shaft 204 and central shaft 202. Offset shaft 204 may be surrounded by an offset gear 220. Offset gear 220 meshes with ring gear 218. As offset shaft 204 rotates around central shaft 202, offset gear 220 rotates offset shaft 204 about offset axis O.

As shown in FIG. 2, offset shaft 204 may rotate with output carrier 110 about central axis C, and may also rotate about offset axis O, resulting in a planetary rotation. In other words, offset shaft 204 may rotate in a planetary rotation pattern about central axis C. Planetary rotation, planetary rotation pattern, or rotation in a planetary fashion, as used herein, includes spinning an object (e.g., offset shaft 204) about a first axis centered over the object while spinning the object about a second axis, the object and first axis offset from the second axis. Additionally or alternatively, motor 142 may reverse the direction of planetary rotation. In other words, motor 142 may be configured to rotate central shaft 202 and offset shaft 204 in a clockwise direction and a counterclockwise direction.

In some examples, auxiliary attachment point 201 may be a stationary shaft 206. As shown, stationary shaft 206 is coupled to head 102. Stationary shaft 206 may define a stationary axis F. Stationary shaft 206 may be stationary when motor 142 rotates central shaft 202 or output carrier 110. Although referred to herein as stationary shaft 206, stationary shaft 206 may be any suitable connection along head 102 or base 104, including upright support 112. Stationary shaft 206 connects to mixing assembly 210.

In some embodiments, head 102 of stand mixer 100 includes two or more shafts. For example, head 102 may include central shaft 202, offset shaft 204, and stationary shaft 206. In some examples, head 102 of stand mixer 100 includes at least two shafts of the set of shafts comprising: the central shaft 202, stationary shaft 206, and offset shaft 204. As explained in more detail below, different coupling combinations between these shafts and/or different gearing arrangements may result in new, non-planetary motion profiles, patterns, rotation patterns, directions of rotation, etc.

Examples are provided below showing different coupling combinations with input motions to generate different output motions. However, using the teaching disclosed herein, one of ordinary skill in the art will understand that other constructions and methods of operation may be used in still other embodiments of the invention.

Turning to FIGS. 3 through 8, stand mixer 100 includes a mixing assembly 210. Mixing assembly 210 includes a transmission assembly 212 and a mixer attachment 214. Mixing assembly 210 connects to at least two shafts of head 102.

Transmission assembly 212 may mechanically couple to at least two of central shaft 202, offset shaft 204, or stationary shaft 206. In some embodiments, transmission assembly 212 mechanically couples to central shaft 202 and auxiliary attachment point 201. For example, transmission assembly 212 may mechanically couple to central shaft 202 and offset shaft 204. In some examples, transmission assembly 212 may mechanically couple to central shaft 202 and stationary shaft 206. Transmission assembly 212 may be removable from the two shafts it is configured to mechanically couple to, such that the mixing assembly 210 may be removable from the head 102.

Transmission assembly 212 may be configured to accept at least two shafts. The at least two shafts may provide an input motion to the transmission assembly 212. For example, central shaft 202 and auxiliary attachment point 201 may provide the input motion to transmission assembly 212. In some examples, central shaft 202 and offset shaft 204 may provide the input motion. Transmission assembly 212 generates an output motion from the input motion. The input motion is different from the output motion. Types of motion will be discussed in more detail below.

Figure 3:
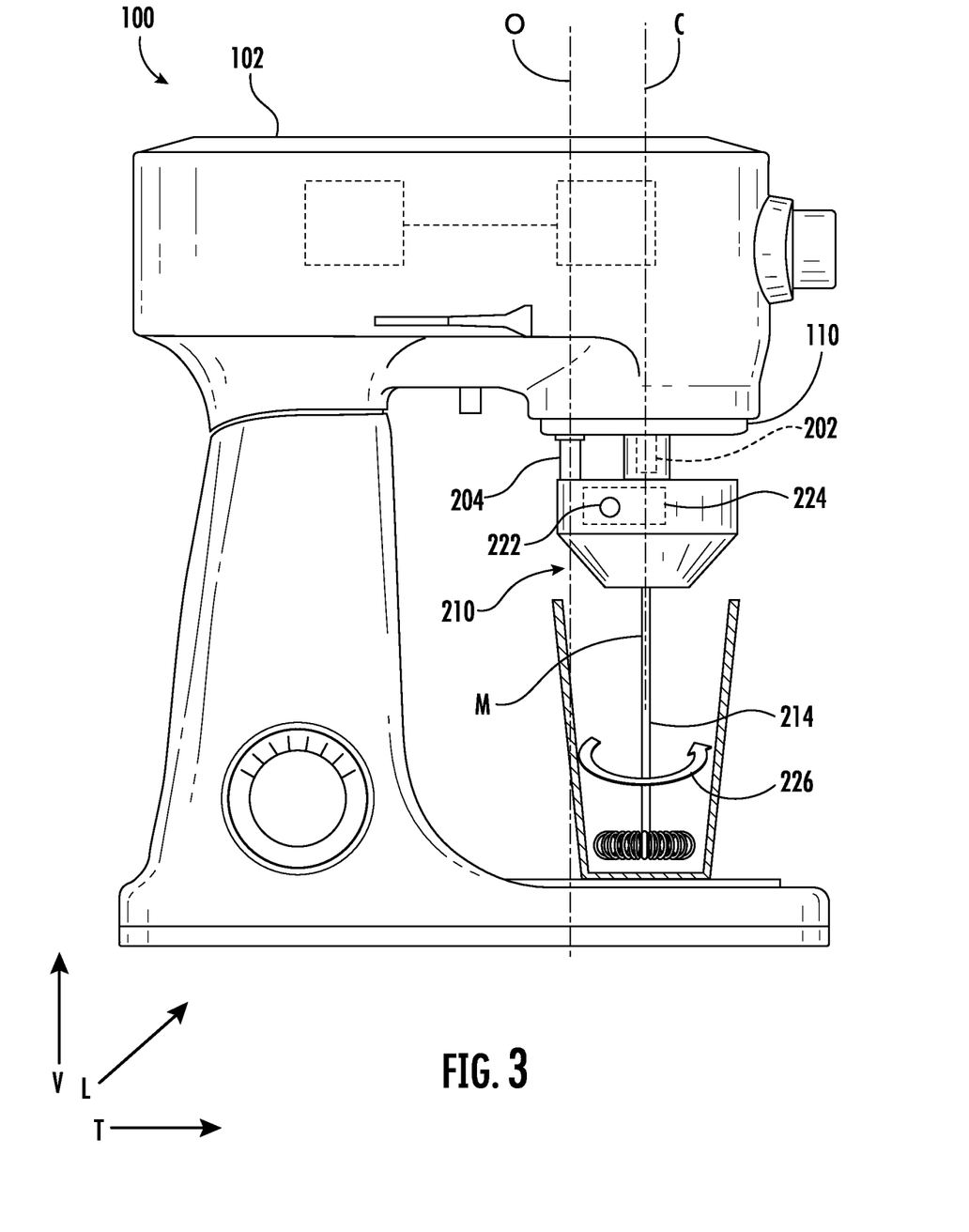
FIG. 3 provides a perspective view of a stand mixer with a first attachment according to exemplary embodiments of the present disclosure.

Transmission assembly 212 may generate the output motion by use of various mechanical connections or coupling arrangements. For example, transmission assembly 212 may include at least one gear 222 (e.g., as shown in FIG. 3). In some examples, transmission assembly 212 includes a geared assembly 224 (e.g., as shown in FIG. 3). Transmission assembly 212 is configured to generate an output motion. Geared assembly 224 may aid in generating an output motion. In some embodiments, geared assembly 224 may include a gearbox or a gear train. Transmission assembly 212 may include one or more of: bevel gears, miter gears, rack and pinions, worm gears, ratchets, clutches, crankshafts, or belt systems. Transmission assembly 212 may be configured to translate input motion from the head 102 into a different output motion using gearing or mechanical configurations. Different gearing or mechanical configurations may generate different output motions for different embodiments.

Mixer attachment 214 of mixing assembly 210 may be configured to move in the output motion generated by transmission assembly 212. Mixer attachment 214 may be configured to move in a non-planetary motion by transmission assembly 212. In some embodiments, transmission assembly 212 may translate the rotation of the central shaft 202 and the rotation of the offset shaft 204 into a non-planetary motion. The non-planetary motion may be the output motion.

Additionally or alternatively, transmission assembly 212 of mixing assembly 210 may be configured to reduce or increase a relative speed of mixer attachment 214 relative to the central shaft 202. In some examples, the speed may be reduced or increased relative to the central shaft 202 or relative to the offset shaft 204. In some examples, transmission assembly 212 may be mechanically connected to mixer attachment 214 to control a rotational movement of mixer attachment 214. For example, a gear assembly, gearbox, gear train, or other gearing arrangement may be used to decrease or increase the rotation speed of mixer attachment 214 relative to the speed of the central shaft 202 or offset shaft 204. As would be understood, a plurality of gears connected to the central shaft 202 or the offset shaft 204 may be further connected to other gears to increase or decrease the relative speed of motion of the mixer attachment 214. Larger gears may be used with shafts 202, 204 to generate slower motion, and smaller gears may be used with shafts 202, 204 to generate faster motion. In some embodiments, a combination of gears of varying sizes may be used to translate the rotational speed of shafts 202, 204 into a desired rotational speed of mixer attachment 214. Gearing ratios or similar calculation methods may be used to determine what size of gears calculate desired speed outputs based on the needs of each embodiment, as would be understood.

For example, as shown in FIG. 3, mixer attachment 214 is configured to rotate about an attachment axis M at an increased speed relative to the central shaft 202 or relative to the offset shaft 204. Transmission assembly 212 is attached to central shaft 202 and offset shaft 204 in FIG. 3. Rotation direction arrow 226 depicts this rotational movement. Though attachment axis M is shown as aligned with central axis C, attachment axis M may be a parallel axis to central axis C or offset axis O, depending on the needs of the embodiment. Mixer attachment 214 of FIG. 3 is shown as an immersion blender attachment.

Figure 4:
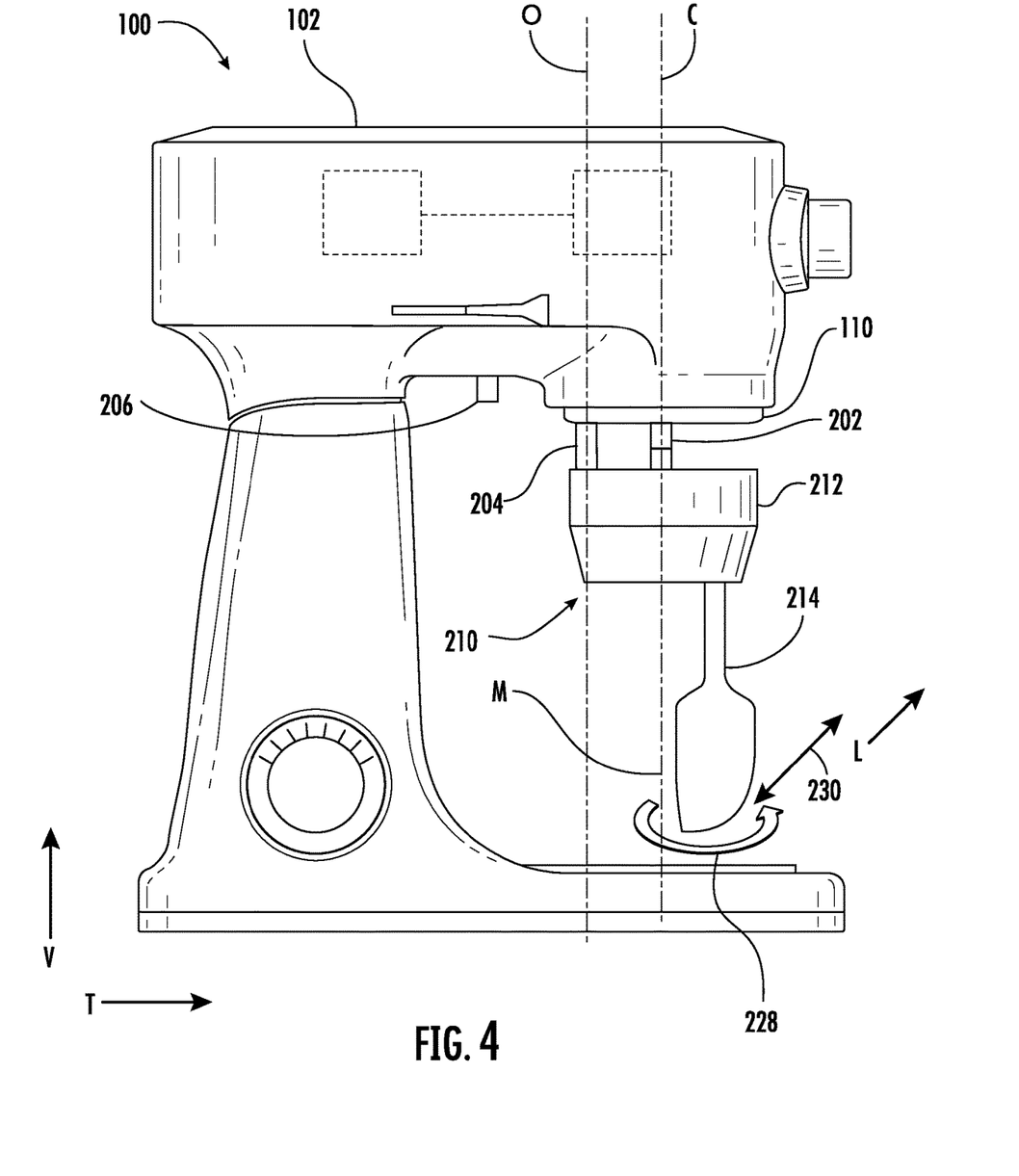
FIG. 4 provides a perspective view of a stand mixer with a second attachment according to exemplary embodiments of the present disclosure.
Figure 5:
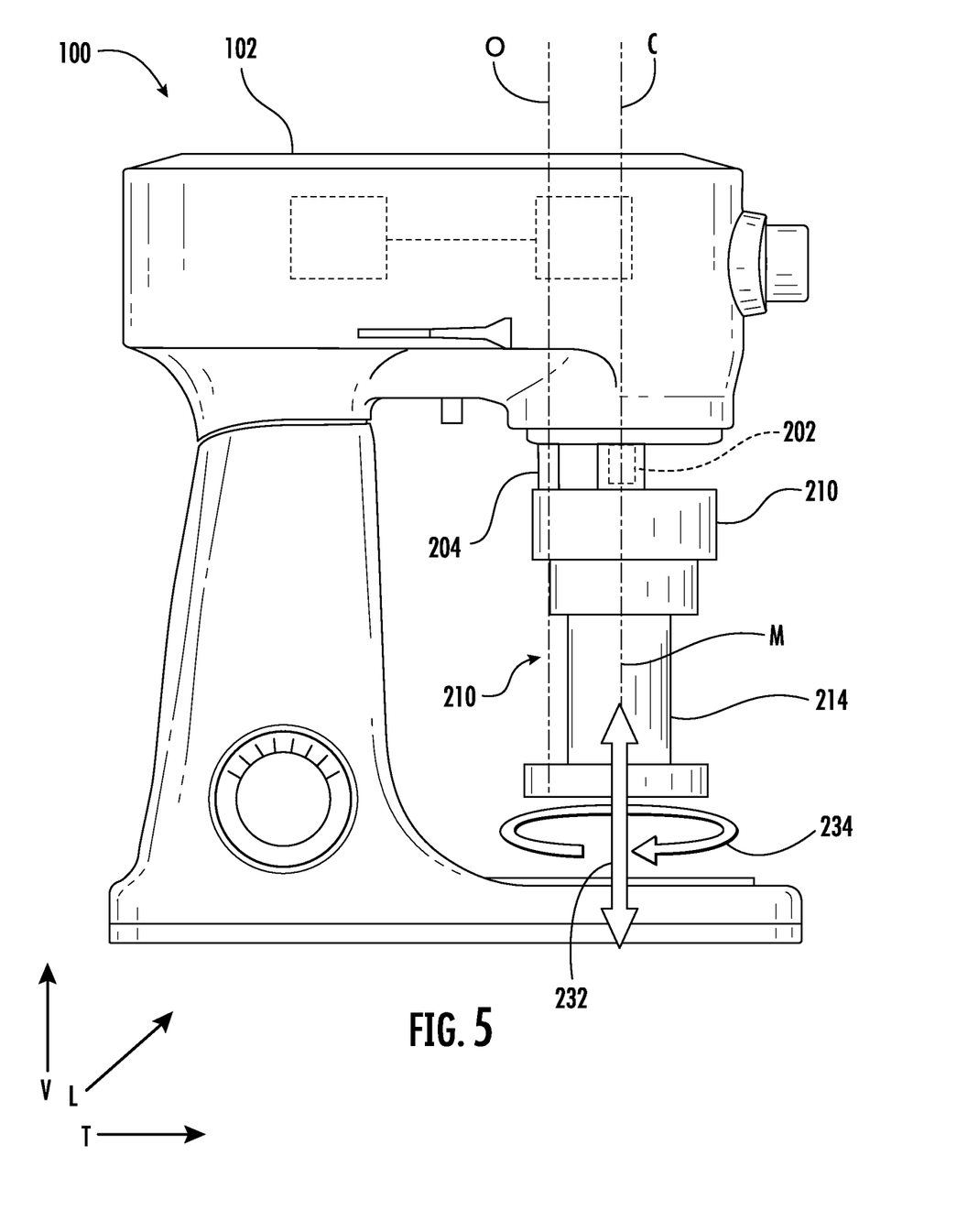
FIG. 5 provides a perspective view of a stand mixer with a third attachment according to exemplary embodiments of the present disclosure.

As shown in FIG. 4, mixer attachment 214 may be configured to rotate about an attachment axis M at a reduced speed relative to central shaft 202 or offset shaft 204. In the illustrated embodiment of FIG. 4, transmission assembly 212 is attached to central shaft 202 and offset shaft 204. Rotation direction arrow 228 depicts the rotational movement. In the example of FIG. 4, transmission assembly 212 is further configured to oscillate the mixer attachment 214. Oscillation direction arrow 230 depicts one version of this oscillation movement in a non-vertical direction. For example, transmission assembly 212 may include a crankshaft connected to bevel gears which may translate the motion of central shaft 202 and/or offset shaft 204 into oscillation in a non-vertical direction. In some embodiments, a mutilated gear, or incomplete gear, may also aid in oscillation movement. Oscillation may occur in a vertical direction (as shown in FIG. 5) in some embodiments. In this regard, transmission assembly 212 is configured to rotate the mixer attachment 214 at a speed slower than the input motion and to oscillate the mixer attachment 214. The output motion includes the combination movement of rotation and oscillation. Mixer attachment 214 of FIG. 4 is shown as a spatula attachment.

As shown in FIG. 5, mixer attachment 214 may be configured to rotate about an attachment axis M while also being oscillated. Optionally, transmission assembly 212 may be attached to central shaft 202 and offset shaft 204 in FIG. 5. Transmission assembly 212 may be configured to generate this rotation and oscillation movement from the input motion of the central shaft 202 and the offset shaft 204. In the example of FIG. 5, oscillation may occur in the vertical direction, as shown by oscillation direction arrow 232. Rotation about axis M, which may be an axis orientated in the vertical direction V, as shown by rotation arrow 234, may occur during oscillation.

Figure 6:
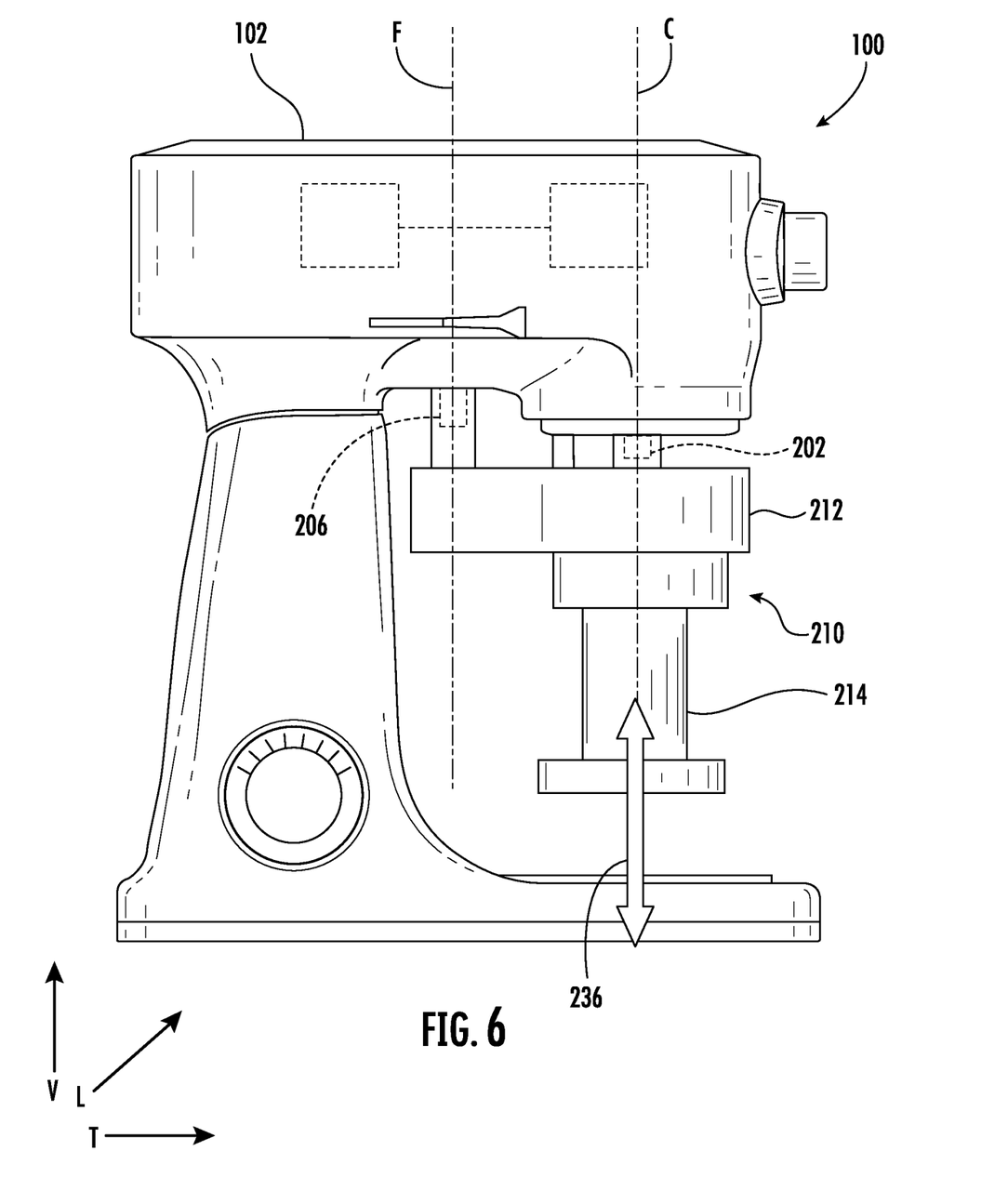
FIG. 6 provides a perspective view of a stand mixer with a fourth attachment according to exemplary embodiments of the present disclosure.

As shown in FIG. 6, mixer attachment 214 may be configured to be oscillated. Mixing assembly 210 is removably attached to central shaft 202 and stationary shaft 206. Central shaft 202 and stationary shaft 206 may provide an input motion to transmission assembly 212. Central shaft 202 may move relative to stationary shaft 206 as central shaft 202 rotates about central axis C, and stationary shaft 206 remains stationary on the head 102. According to the arrangement, mixer attachment 214 is configured to oscillate in vertical direction V. Transmission assembly 212 may generate the oscillation motion as the output motion from the central shaft 202 and the stationary shaft 206. Oscillation motion arrow 236 may depict output motion in FIG. 6. A belt system or crankshaft (not shown) may be used in transmission assembly 212 to aid in generating the oscillating output movement. In the embodiment of FIG. 6, mixing assembly 210 does not rotate with the rotation of central shaft 202 or offset shaft 204.

Mixer attachment 214 of FIGS. 5 and 6 is shown as a mashing attachment. Mashing attachment may further have holes, spikes, or a flat surface to provide different mashing abilities. For example, mashing soft vegetables may use holes. Spikes may be useful for tenderizing meat. A flat surface may be useful for flattening activities, such as doughs. Other mashing surfaces may also be utilized.

Figure 7:
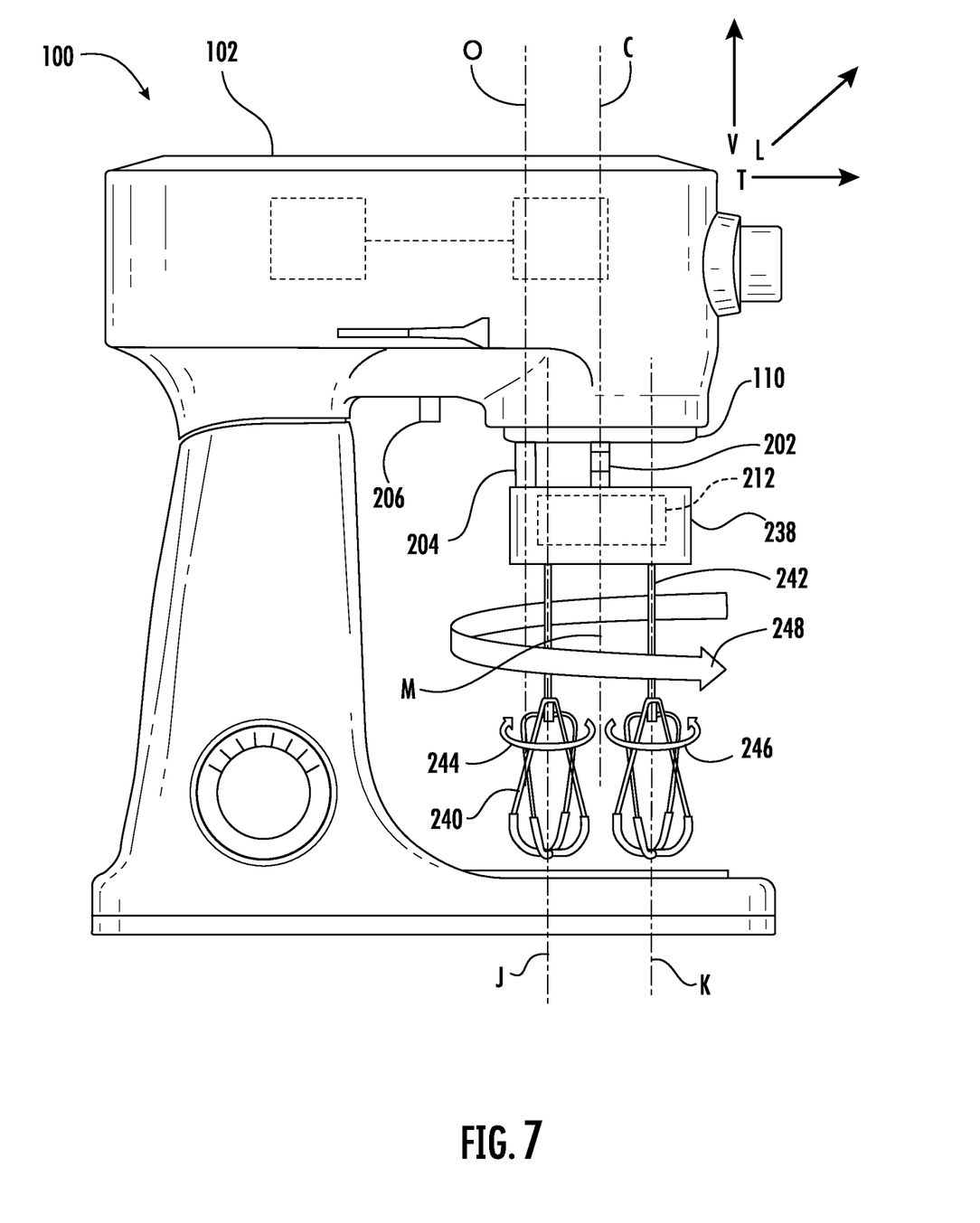
FIG. 7 provides a perspective view of a stand mixer with a fifth attachment according to exemplary embodiments of the present disclosure.

Turning to FIG. 7, mixer attachment 214 may further include a base 238 housing transmission assembly 212, a first member 240, and a second member 242. First member 240 may be mechanically coupled to transmission assembly 212 and to base 238. Second member 242 may be mechanically coupled to transmission assembly 212 to base 238. The first member 240 may be configured to rotate in a first rotational direction 244 (e.g., a clockwise direction) about a first axis J. The second member 242 may be configured to rotate in a second rotational direction 246 (e.g., a counter-clockwise direction) about a second axis K. Second rotational direction 246 may be opposite first rotational direction 244. As shown, base 238 is configured to rotate about a third axis L. Third axis L is offset from first axis J and second axis K. Base 238 is further configured to rotate, as shown by rotational direction arrow 248 about third axis L while first member 240 and second member 242 are also rotating about first axis J and second axis K, respectively. The rotation of base 238, the rotation of first member 240, and the rotation of second member 242 may comprise output motion.

For example, first member 240 and second member 242 may be whisk attachments. Whisk attachments may rotate in opposite directions (e.g., first member 240 rotates clockwise, and the second member 242 rotates counterclockwise), while base 238 rotates both whisks in a circular fashion. Such motion may be similar to a hand mixer appliance movement within a bowl combined with a user independently rotating the bowl.

Additionally or alternatively, transmission assembly 212 may be configured to move first member 240 at a higher speed than the movement of a second member 242.

Figure 8:
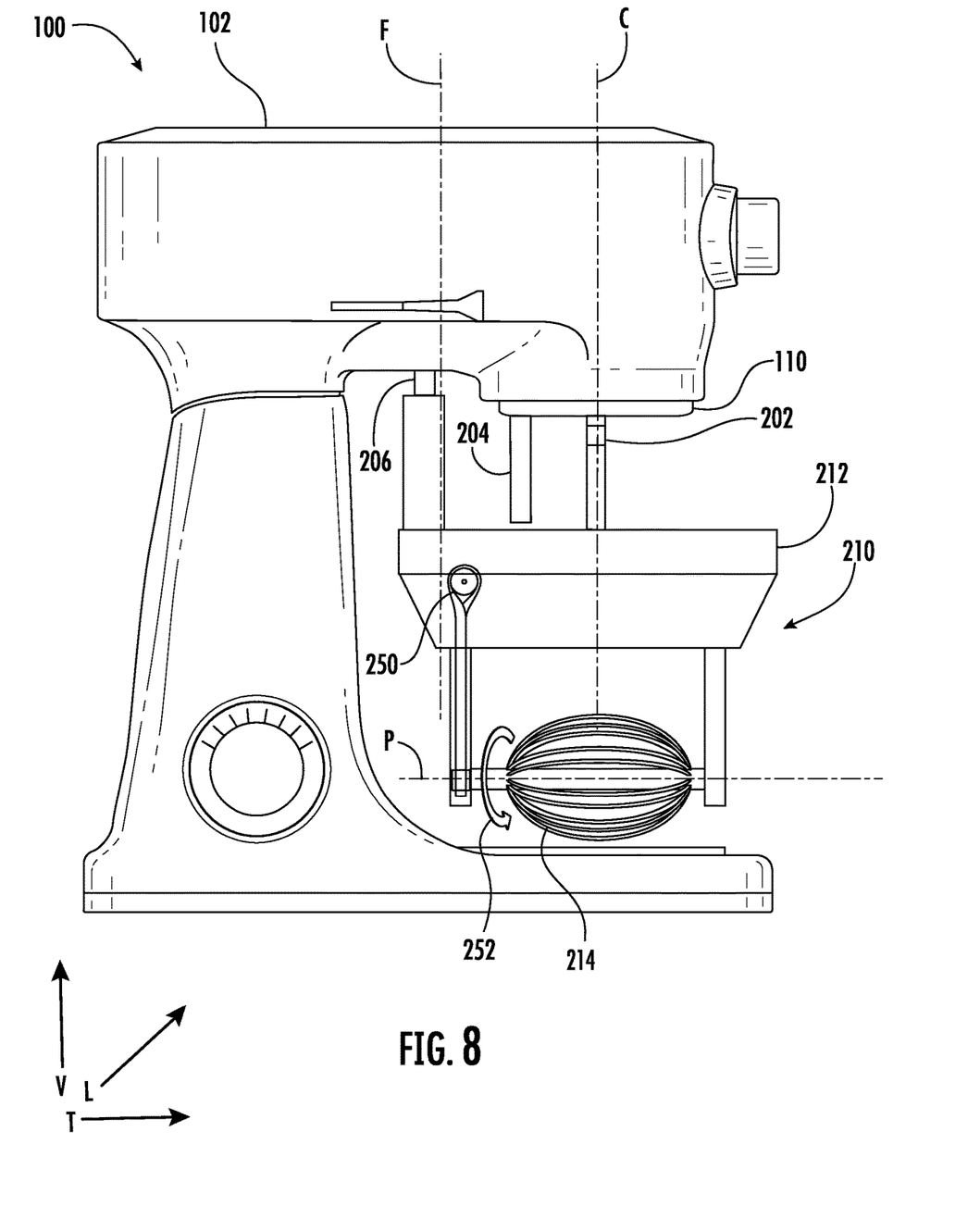
FIG. 8 provides a perspective view of a stand mixer with a sixth attachment according to exemplary embodiments of the present disclosure.

As shown in FIG. 8, mixer attachment 214 may be configured to rotate about an axis P nonparallel to central axis C. Transmission assembly 212 may comprise at least one gear 250, such as a gear for a belt drive assembly. Gear 250 may be configured to generate output motion 252 with an output axis V of rotation nonparallel to central axis C. For example, transmission assembly 212 may rotate mixer attachment 214 about an axis perpendicular to central axis C. Additionally or alternatively, instead of a belt drive system with gear 250, gear 250 may be a gearing arrangement using bevel gears, miter gears, etc. Mixer attachment 214 may be a whisk orientated around an axis perpendicular to vertical direction V.

As shown in FIGS. 3 through 8, mixer attachment 214 of mixing assembly 210 may include various mixing or movement forms. Mixer attachment 214 may include at least one of an immersion blender, a mashing mechanism, a whisk, a paddle, a spatula, or a dough hook. Other mixer attachments 214 may be used depending on the needs of the specific embodiment.

Embodiments described herein may include a stand mixer that provides different relative motions with controlled variable speed and direction based on the coupling points. Mixing assembly of stand mixer may be attached to the output shaft, the output carrier, the offset shaft, the stationary shaft, and/or the outer case. By virtue of these attachment points, the attachment may achieve variable motion and direction which can be set according to the needs of each embodiment. The relative motion may vary depending upon the coupling points to which the attachment is attached thereto. The attachment can be driven by the offset shaft in a planetary motion or directly driven by the central shaft. Advantageously, embodiments described herein may provide options for designing attachments that do not follow the prescribed planetary motion, such as those that require different actions such as momentary or cyclic motion, those that regulate a required speed (high or low) for the attachment, those that have attachments with moving and stationary pieces, and those that have a range of motions.

In some embodiments, the mixing assembly may be attached to the offset shaft and to the output carrier, which can either be centered (e.g., attached to the central shaft) or off-centered. By attaching to both the offset shaft and the output carrier, mixing assembly with transmission assembly can leverage the relative speed difference. This can create a higher or lower speed depending on the design of the transmission assembly.

In some embodiments, the mixing assembly may achieve the same speed as the output carrier and may leverage the relative speed difference between the offset shaft and the output carrier.

For example, when coupled to offset shaft and stationary shaft, low speed motion may be obtained, oscillation motion may be obtained via the transmission assembly (e.g., by use of a geared assembly). Also, two output points can be achieved for alternate mixing option (e.g., as shown in FIG. 7).

In some examples, when coupled to offset shaft and central shaft, different mixing and stirring options may be available. For example, if the mixer has a reversible motor, the output attachment may have two distinct actions: one motion in the forward direction, and another in the motor reverse direction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer having a vertical direction, a transverse direction, and a lateral direction, the stand mixer comprising:
    a motor;
    a head comprising a central shaft operably coupled to the motor and rotating about a central axis, and an offset shaft operably coupled to the motor and rotating about an offset axis; and
    a mixing assembly comprising a transmission assembly mechanically coupling the central shaft and the offset shaft, and a mixer attachment mechanically coupled to the transmission assembly,
    wherein the central shaft and the offset shaft provide an input motion and the transmission assembly generates an output motion from input motion, the mixer attachment moving in the output motion,
    wherein the input motion is different from the output motion, and
    wherein the transmission assembly is configured to rotate the mixer attachment at a speed slower than the input motion and to oscillate the mixer attachment, the output motion comprising a combination movement of rotation and oscillation.

2. The stand mixer of claim 1, wherein the transmission assembly of the mixing assembly is configured to reduce or increase a relative speed of the mixer attachment relative to the central shaft or relative to the offset shaft.

3. The stand mixer of claim 1, wherein the offset shaft rotates in a planetary rotation pattern about the central axis, and the transmission assembly translates the rotation of the central shaft and the rotation of the offset shaft into a non-planetary motion.

4. The stand mixer of claim 1, wherein the transmission assembly further comprises a geared assembly, the geared assembly aiding in generating the output motion.

5. The stand mixer of claim 1, wherein the mixer attachment further comprises:
    a base housing the transmission assembly;
    a first member mechanically coupled to the transmission assembly and to the base, the first member configured to rotate in a clockwise direction about a first axis; and
    a second member mechanically coupled to the transmission assembly and to the base, the second member configured to rotate in a counterclockwise direction about a second axis,
    wherein the base is configured to rotate about a third axis offset from the first axis and the second axis while the first member and the second member are also rotating, and
    wherein the rotation of the base, the rotation of the first member, and the rotation of the second member comprise the output motion.

6. The stand mixer of claim 1, wherein the mixer attachment comprises at least one of: an immersion blender, a mashing mechanism, a whisk, a paddle, a spatula, or a dough hook.

7. The stand mixer of claim 1, wherein the motor is configured to rotate the central shaft and the offset shaft in a forward direction and a reverse direction.

8. A stand mixer having a vertical, a transverse, and a lateral direction, the stand mixer comprising:
    a motor;
    a head comprising a central shaft operably coupled to the motor and rotating about a central axis, and an auxiliary attachment point;
    a mixing assembly comprising a transmission assembly mechanically coupling the central shaft and the auxiliary attachment point, and a mixer attachment mechanically coupled to the transmission assembly, wherein the central shaft and the auxiliary attachment point provide an input motion and the transmission assembly generates an output motion from input motion, the mixer attachment moving in the output motion, and wherein the input motion is different from the output motion;

a base mechanically coupled to the transmission assembly;

a first member mechanically coupled to the transmission assembly and to the base, the first member configured to rotate in a clockwise direction about a first axis; and a second member mechanically coupled to the transmission assembly and to the base, the second member configured to rotate a counterclockwise direction about a second axis, wherein the base is configured to rotate about a third axis during a rotation of the first member and the second member, the third axis offset from the first axis and the second axis, and wherein the rotation of the base, the rotation of the first member, and the rotation of the second member comprise the output motion.

9. The stand mixer of claim 8, wherein the transmission assembly of the mixing assembly is configured to reduce or increase a relative speed of the mixing assembly relative to the central shaft.

10. The stand mixer of claim 8, wherein the mixer attachment is configured to move in a non-planetary motion by the transmission assembly.

11. The stand mixer of claim 8, wherein the transmission assembly further comprises a geared assembly, the geared assembly aiding in generating the output motion.

12. The stand mixer of claim 8, wherein the auxiliary attachment point comprises an offset shaft operably coupled to the motor, rotating about an offset axis, and rotating with the central shaft.

13. The stand mixer of claim 12, wherein the transmission assembly is configured to rotate the mixer attachment at a speed slower than the input motion and to oscillate the mixer attachment, the output motion comprising a combination movement of rotation and oscillation.

14. The stand mixer of claim 8, wherein the auxiliary attachment point is a stationary shaft coupled to the head of the stand mixer.

15. The stand mixer of claim 14, wherein the transmission assembly further comprises at least one gear configured to generate an output motion with an output axis of rotation nonparallel to the central axis.

16. The stand mixer of claim 14, wherein the transmission assembly is configured to oscillate the mixer attachment, the output motion comprising an oscillation motion.

17. A stand mixer having a vertical, a transverse, and a lateral direction, the stand mixer comprising:

a motor;

a head comprising a central shaft operably coupled to the motor and rotating about a central axis, an offset shaft operably coupled to the motor and rotating about an offset axis, and a stationary shaft; and a mixing assembly comprising a transmission assembly mechanically coupling at least two of: the central shaft, the offset shaft, or the stationary shaft, and a mixer attachment mechanically coupled to the transmission assembly, wherein at least two of the central shaft, the offset shaft, or the stationary shaft provide an input motion and the transmission assembly generates an output motion from input motion, the mixer attachment moving in the output motion, and wherein the input motion is different from the output motion.

18. The stand mixer of claim 17, wherein the transmission assembly of the mixing assembly is configured reduce or increase a relative speed of the mixing assembly relative to the central shaft or the offset shaft.

* * * * *